(12) United States Patent
Lee

(10) Patent No.: US 9,189,706 B1
(45) Date of Patent: Nov. 17, 2015

(54) APPARATUS AND METHOD FOR DETECTING MOTION

(71) Applicant: UDP Technology Ltd., Seoul (KR)

(72) Inventor: Kyu Sang Lee, Seoul (KR)

(73) Assignee: UDP Technology Ltd., Yangchen-ro, Gangseogu, Seoul (KR)

( * ) Notice: Subject to any disclaimer, the term of this patent is extended or adjusted under 35 U.S.C. 154(b) by 0 days.

(21) Appl. No.: 14/340,172

(22) Filed: Jul. 24, 2014

(30) Foreign Application Priority Data

Jun. 26, 2014 (KR) ........................ 10-2014-0079177

(51) Int. Cl.
*G06K 9/00* (2006.01)
*G06K 9/62* (2006.01)
*G06T 7/20* (2006.01)

(52) U.S. Cl.
CPC ............ *G06K 9/6212* (2013.01); *G06T 7/2033* (2013.01); *G06K 2009/6213* (2013.01); *G06T 2207/10016* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,327,232 | A * | 7/1994 | Kim | ...................... | G06T 7/2026 348/699 |
| 5,751,378 | A * | 5/1998 | Chen | ...................... | G06T 7/2053 348/699 |
| 6,931,146 | B2 * | 8/2005 | Aoki | ...................... | G06T 7/2053 348/155 |
| 7,362,808 | B2 * | 4/2008 | Kang | ...................... | H04N 19/53 375/240 |
| 7,945,109 | B2 * | 5/2011 | Nakami | ................... | G06T 5/009 382/261 |
| 8,934,030 | B2 * | 1/2015 | Kim | ...................... | H04N 1/4092 348/222.1 |
| 2001/0004400 | A1 * | 6/2001 | Aoki | ...................... | G06T 7/2053 382/107 |
| 2004/0114688 | A1 * | 6/2004 | Kang | ...................... | H04N 19/53 375/240.12 |
| 2004/0234153 | A1 * | 11/2004 | Nakami | ................... | G06T 5/009 382/254 |
| 2013/0314557 | A1 * | 11/2013 | Furukawa | .............. | H04N 5/225 348/208.1 |
| 2014/0119602 | A1 * | 5/2014 | Zuo | ........................ | G06T 7/2033 382/103 |

FOREIGN PATENT DOCUMENTS

| | | |
|---|---|---|
| KR | 10-20100104536 A | 9/2010 |
| KR | 10-20110023468 A | 3/2011 |

* cited by examiner

*Primary Examiner* — Anand Bhatnagar
(74) *Attorney, Agent, or Firm* — East West Law Group; Heedong Chae

(57) ABSTRACT

The present invention relates to a motion detecting apparatus and method which is capable of correctly detecting a moving object by determining a motion variation on a pixel basis through comparison between frames. The motion detecting apparatus can correctly detect a region of a moving object by determining whether pixels of the input image correspond to an object, garbage or background on a pixel-basis and can prevent a detected object from missing from an overlapping region occurring in object detection through the existing frame-based comparison, which can result in high accuracy of detection of the moving object.

9 Claims, 8 Drawing Sheets

(a)

(b)

INPUT IMAGE

BACKGROUND

OBJECT

APPARATUS AND METHOD FOR DETECTING MOTION

CROSS-REFERENCE TO RELATED APPLICATION

This application claims the benefit of Korean Application No. 10-2014-0079177, filed on Jun. 26, 2014, with the Korean Intellectual Property Office, the disclosure of which is incorporated herein by reference.

BACKGROUND OF THE INVENTION

1. Field of the Invention

The present invention relates to a motion detecting apparatus and method which is capable of correctly detecting a moving object by determining a motion variation on a pixel basis through comparison between frames.

2. Description of the Related Art

With active introduction of monitoring systems into a wide range of applications, techniques for improving performance of the monitoring systems have been consistently developed.

Main concerns on evaluation of such monitoring system performance involve accuracy of object detection. Above all, it is important to correctly detect an object even under noise and illumination conditions which occur under the influence of environments in which the monitoring system is installed.

Most of existing motion detection algorithms for object detection involve detecting an object by separating portions corresponding to a foreground and a background from an image.

To this end, the existing motion detection algorithms extract an object from a differential image between a current frame and an established frame. However, these algorithms have limitation in correct detection of an object which is consistently moving.

In other words, if motion of an object in the established frame is insignificant in the current frame in a certain direction, a differential image is obtained with loss of a region where objects overlap with each other in the current frame and the established frame. Accordingly, the objects are detected with an area smaller than an actual object area, which may result in poor accuracy.

Furthermore, according to the existing motion detection algorithms, depending on the monitoring environments, noises occur frequently, such as detecting typical background motion, such as varying shadow and shaking tree branches, as a foreground, which may result in poor accuracy of object detection under low illumination circumferences.

RELATED TECHNICAL DOCUMENT

Patent Document

Korean Patent Registration No. 10-0468643

SUMMARY OF THE INVENTION

Accordingly, it is an object of the present invention to provide an apparatus which is capable of detecting a moving object in an input image on a pixel basis and determining the object as a background if the object is detected for a predetermined period of time, thereby allowing an additional object to be correctly detected.

According to an embodiment of the present invention, there is provided an apparatus for detecting a motion, including: a receiving unit which receives an input image; an average calculating unit which calculates an average of pixels by accumulating brightness of the input image on a pixel basis; an updating unit which updates the average with an updated average obtained by averaging brightness of featured pixels, in corporation with the average calculating unit, the featured pixels having an absolute value of deviation between the brightness and the average exceeding a preset object reference value, and the featured pixels accumulated from a point of time when the absolute value is received, if the absolute value exceeds the object reference value for more than a preset reference time from the point of time; and a determining unit which compares the absolute value with at least one of a preset background reference value and the object reference value for the pixels, determines the pixels as a background if the absolute value is smaller than the background reference value, determines the pixels as garbage to be disregarded if the absolute value is larger than the background reference value and smaller than the object reference value, and determines the pixels as a moving object if the pixels are the featured pixels.

If the number of featured pixels for a region constructed by the featured pixels is larger than a predetermined number, the determining unit may determine the region as an object.

The apparatus may further include a noise attenuating unit which divides the input image into a plurality of blocks, each block having a preset size, scales the input image such that each block corresponds to one pixel, and provides the brightness of the pixels, as an average of brightness of all unit pixels belonging to the blocks, to the average calculating unit.

The blocks may be constituted by n×m unit pixels.

The apparatus may further include a correcting unit which converts the input image into a monochrome image.

The apparatus may further include a sensitivity managing unit which varies at least one of the background reference value and the object reference value based on a user input.

According to another embodiment of the present invention, there is provided a method for detecting a motion in a motion detecting apparatus for detecting a moving object from a received input image, including: a receiving step of receiving an input image; an average calculating step of calculating an average of pixels by accumulating brightness of the input image on a pixel basis; a determining step of comparing an absolute value of deviation between the brightness and the average with at least one of a preset background reference value and an preset object reference value for the pixels, determining the pixels as a background if the absolute value is smaller than the background reference value, determining the pixels as garbage to be disregarded if the absolute value is larger than the background reference value and smaller than the object reference value, and determining the pixels as a moving object if the pixels are featured pixels whose absolute value is larger than the object reference value; and an updating step of updating the average by averaging brightness of the featured pixels, the featured pixels having an absolute value of deviation between the brightness and the average exceeding a preset object reference value, and the featured pixels accumulated from a point of time when the absolute value is received, if the absolute value exceeds the object reference value for more than a preset reference time from the point of time.

The determining step may further include: if the number of featured pixels for a region constructed by the featured pixels is larger than a predetermined number, determining the region as an object.

The method may further include: after the receiving step, a noise attenuating step of dividing the input image into a plurality of blocks, each block having a preset size, scaling the input image such that each block corresponds to one pixel, and calculating the brightness of the pixels as an average of brightness of all unit pixels belonging to the blocks.

The present invention has an advantage in that it can correctly detect a region of a moving object by determining whether pixels of the input image correspond to an object, garbage or background on a pixel-basis and can prevent a detected object from missing from an overlapping region occurring in object detection through the existing frame-based comparison, which can result in high accuracy of detection of the moving object.

In addition, the present invention has another advantage in that it can minimize an effect by noises by treating noises, which are caused by tree branches consistently moving due to wind or the like, shadow or light due to variation of illumination, ripples due to waves, and the like, as garbage and can easily determine an object with no change for a predetermined period of time after motion occurrence, such as no change for a predetermined period of time after turning-on or off of lighting or no change for a predetermined period of time after appearance of a new thing on an input image, as a background later, thereby allowing the object to be easily distinguished from a consistently moving object, which can result in high accuracy and reliability of object detection.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, embodiments of the present invention will be described in detail with reference to the drawings.

Figure 1:
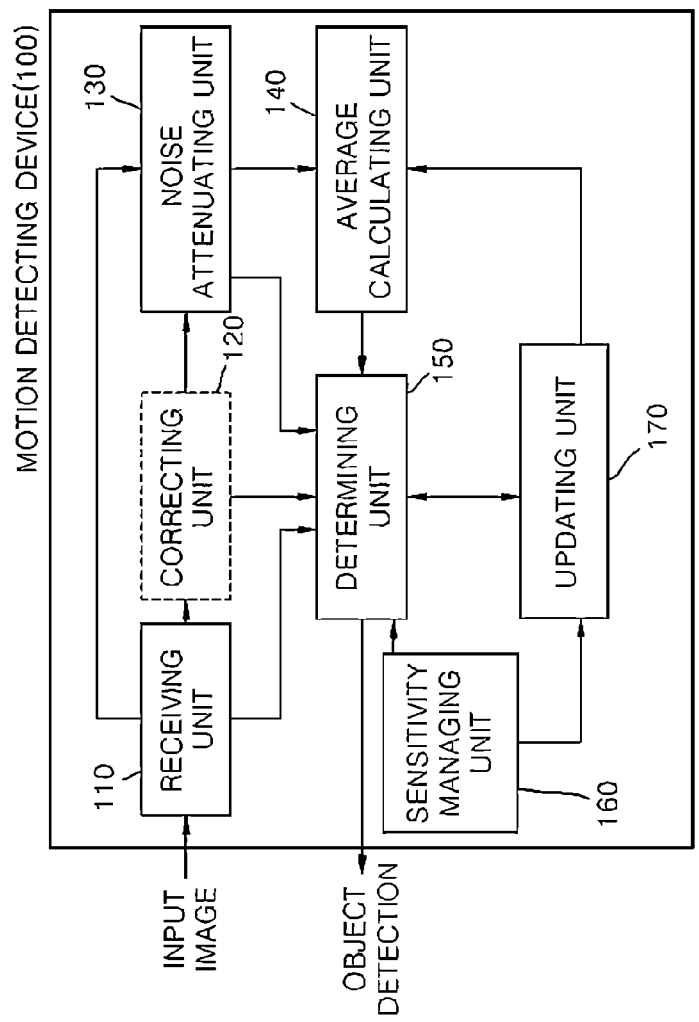
FIG. 1 is a view showing a detailed configuration of a motion detecting apparatus according to an embodiment of the present invention.

FIG. 1 is a view showing a detailed configuration of a motion detecting apparatus 100 according to an embodiment of the present invention. Referring to FIG. 1, the motion detecting apparatus 100 may include a receiving unit 110, a noise attenuating unit 130, an average calculating unit 140, a determining unit 150, a sensitivity managing unit 160 and an updating unit 170.

The motion detecting apparatus 100 may be included in a variety of apparatuses such as a camera, DVR (Digital Video Recorder), NVR (Network Video Recorder) and so on.

First, the receiving unit 110 may receive an input image from an imaging device such as a camera.

The motion detecting apparatus 100 may further include a correcting unit 120 which can convert the input image received from the receiving unit 110 into a monochrome image to provide reduced computational complexity.

Figure 2:
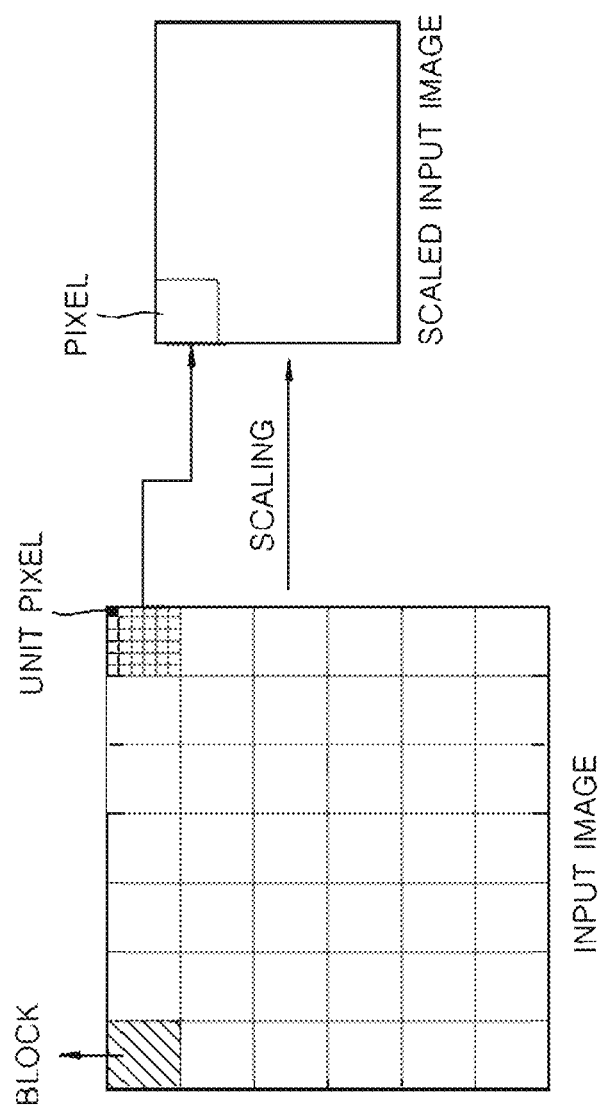
FIG. 2 is a view illustrating an input image scaling converting process of the motion detecting apparatus according to the embodiment of the present invention.

The noise attenuating unit 130 may scale the input image, as shown in FIG. 2. For example, the noise attenuating unit 130 may divide the input image into a plurality of blocks, each of which has a preset size, and may scale the input image such that each of the blocks corresponds to one pixel.

The noise attenuating unit 130 may construct the blocks with n×m unit pixels, preferably 16×16 unit pixels. The noise attenuating unit 130 may also calculate brightness of the blocks by averaging brightness of all unit pixels belonging to the blocks.

Thus, even when noises occur in minority of unit pixels belonging to the blocks, the noise attenuating unit 130 can attenuate the noises by taking an average of the unit pixels and other unit pixels belonging to the blocks, which may result in minimized effects by the noises.

The noise attenuating unit 130 may provide the scaled input image to the average calculating unit 140.

Figure 3:
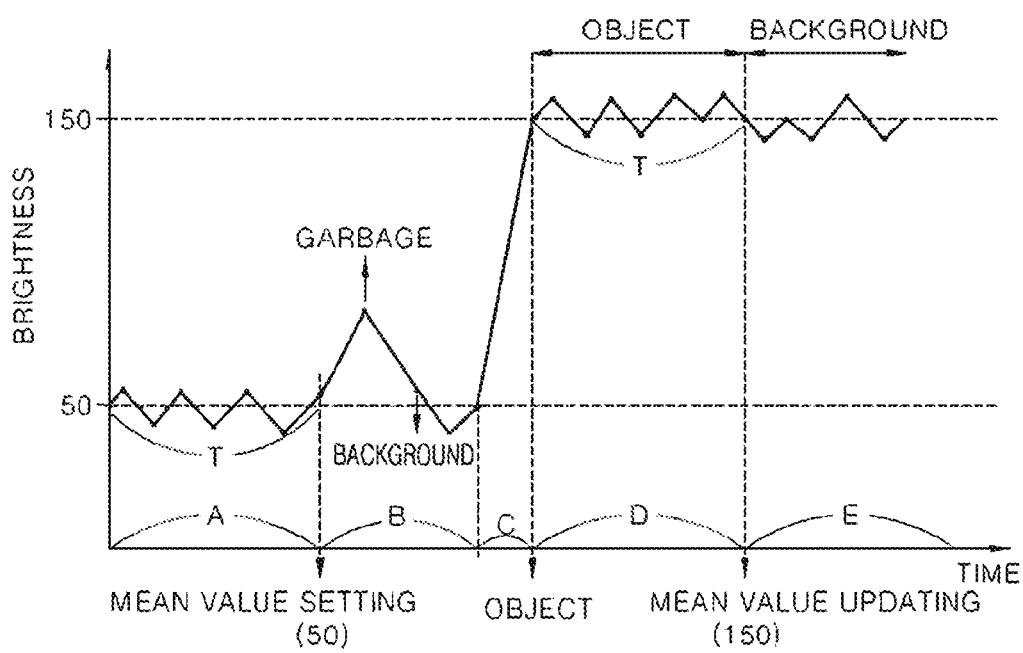
FIG. 3 is a view illustrating a moving object detecting process of the motion detecting apparatus according to the embodiment of the present invention.
Figure 3:
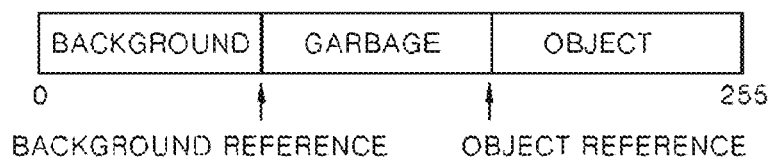

With the above-described configuration, the motion detecting apparatus 100 can determine and detect an object on the basis of pixels constituting the scaled input image, as will be described in detail with reference to FIG. 3.

First, as indicated by a step A included in a graph of FIG. 3(A), the average calculating unit 140 may calculate an average of the pixels by accumulating and averaging brightness on the basis of pixels of the input image received from the noise attenuating unit 130, and provide the calculated pixel average to the determining unit 150.

In this embodiment, the average calculating unit 140 may receive the input image for a preset reference time T, accumulate brightness sufficient for average calculation on a pixel-basis, and calculate the pixel average by averaging the accumulated pixel brightness.

As indicated by a step B included in the graph of FIG. 3(A), the determining unit 150 may receive the scaled input image from the noise attenuating unit 130 and may compare the pixel brightness of the input image with the average calculated by the average calculating unit 140.

Accordingly, the determining unit 150 may calculate an absolute value of deviation between the pixel brightness and the pixel average of the input image received from the noise attenuating unit 130.

As shown in FIG. 3(B), a background reference value acting as a reference for background distinction and an object reference value acting as a reference for object distinction may be preset in the determining unit 150.

The background reference value is defined as a reference for pixels determined as the background. Since less deviation between the current brightness and the average for the pixels means less difference between the current brightness and the established brightness, the background reference value indicates an allowable deviation between brightness determined as the background and an average.

The object reference value is defined as a reference for pixels determined as an object. If the deviation between the current brightness and the average for the pixels exceeds a certain value, this may be regarded as variation of the pixel brightness by a moving object.

The sensitivity managing unit 160 may receive the background reference value and the object reference value from a user and set these reference values in the determining unit 150. The sensitivity managing unit 160 may also vary at least one of the background reference value and the object reference value according to the user input. Accordingly, the user can vary determination sensitivity of the determining unit 150 according to a reference for determination of the background and the object.

Accordingly, as indicated in the step B of FIG. 3(A), the determining unit 150 may compare the absolute value with the background reference value. If the absolute value is smaller than the background reference value, the determining unit 150 may determine that there is no difference between the absolute value and the average of accumulated brightness and accordingly may determine pixels corresponding to the absolute value as the background.

On the contrary, if the absolute value lies between the background reference value and the object reference value as indicated in the step B of FIG. 3(A), the determining unit 150 may determine this as variation of brightness by noises and accordingly determine the pixels as garbage, as shown in FIG. 3(B). As one example, if the absolute value of the pixels is larger than the background reference value and smaller than the object reference value, the determining unit 150 may determine the corresponding pixels as garbage and disregard these pixels.

Thereafter, as indicated in a step C of FIG. 3(A), if the absolute value exceeds the object reference value as the pixel brightness is greatly varied, the determining unit 150 may determine that the pixel brightness is varied according to motion of the object.

Accordingly, the determining unit 150 may determine featured pixels, which are pixels with the absolute value exceeding the object reference value, of pixels included in the input image, as the object.

At this time, the determining unit 150 may detect an object region constructed by the featured pixels in the input image and compare the number of featured pixels belonging to the object region with a preset reference number. If the number of featured pixels is equal to or larger than the reference number, the determining unit 150 may detect the featured pixels belonging to the object region as a moving object and provide the object region as information on the moving object.

In other words, the determining unit 150 may determine the featured pixels as the object only when the number of featured pixels belonging to the object region constructed by the featured pixels is equal to or larger than the preset reference number. If the number of featured pixels belonging to the object region is smaller than the preset reference number, the determining unit 150 may determine the featured pixels as noises caused by moving tree branches, light, shadow and so on.

With the above-described configuration, the motion detecting apparatus 100 may determine whether pixels of the input image correspond to an object, garbage or background on a pixel basis to detect variation of pixels corresponding to a moving object on a pixel-basis, thereby correctly detecting a pixel region corresponding to the object with no loss.

Accordingly, as opposed to conventional techniques in which some regions of a moving object detected through frame-based comparison overlap each other are detected with any loss due to a difference between an established frame and a current frame, the present invention is capable of collectively detecting pixels whose brightness is varied above or below an average, on a pixel basis to detect fully the entire region of the moving object, which can result in significant improvement of accuracy and reliability of detection of the moving object.

As indicated in a step D of FIG. 3(A), if the determining unit 150 determines that the absolute value of the featured pixels exceeds the object reference value for more than the preset reference time T from the point of time when the absolute value exceeding the object reference value for the featured pixels, the updating unit 170 may update the average corresponding to the featured pixels as an updated average obtained by averaging the brightness of the featured pixels accumulated for the preset reference time from the point of time in cooperation with the average calculating unit 140.

Accordingly, the determining unit 150 may calculate the absolute value of deviation between the updated average and the brightness for the featured pixels whose average is updated. As a result, the average determined as the background may be increased by the object brightness, so that an object whose motion is not detected after the object appears in the input image can be determined as the object.

That is, when the object with no motion continues to appear in the input image, the updating unit 170 may update the average such that the average corresponds to the brightness varied by the object so that the object can be determined as the background, thereby facilitating distinction between the object and a different moving object appearing in the input image.

As one example, as shown in FIG. 3(A), if the brightness of the pixels received after the pixel average is set to 50 is greatly changed to 150 and the pixels are detected as featured pixels corresponding to the object, the determining unit 150 may provide information on the corresponding featured pixels to the updating unit 170.

Accordingly, the updating unit 170 may determine variation of brightness of the featured pixels in the input image from the point of time when the pixels are detected as the featured pixels, recognize the corresponding featured pixels as pixels corresponding to an object with no motion if the brightness of the featured pixels is changed to about 150 for the preset reference time T and the absolute value of the featured pixels exceeds the presser object reference value for more than the preset reference time T, and update the average of the featured pixels to 150 at the point of time when the preset reference time T expires, in corporation with the average calculating unit 140.

Accordingly, the average calculating unit 140 may provide the updated average of the featured pixels, i.e., 150, to the determining unit 150 and the determining unit 150 may calculate the absolute value by calculating deviation between the updated average, 150, and the brightness of the featured pixels.

Thereafter, since the absolute value is calculated on the basis of the updated average, 150 and the deviation between the updated average and the brightness of the featured pixels is smaller than the background reference value when about 150 is detected as the brightness of the featured pixels, as indicated in a step E of FIG. 3(A), the determining unit 150 may recognize the featured pixels as the background, not the object to distinguish the featured pixels from a different moving object, thereby facilitating detection of different objects.

Through this process, the present invention is capable of recognizing consistently appearing things or persons as the background if they have no motion for a preset time after they are recognized as the first object, thereby easily distinguishing and correctly detecting an object newly added to the input image from the already detected object. In addition, the present invention is capable of treating noises, which are caused by tree branches consistently moving due to wind or the like, shadow or light due to variation of illumination, ripples due to waves, and the like, as garbage to be disregarded, thereby minimizing an effect by the noises which are not recognized as an object.

In addition, it is to be understood that the determining unit 150 can determine the featured pixels as a moving object for the preset reference time from the point of time when the featured pixels are detected, thereby increasing the accuracy of object detection.

Figure 4:
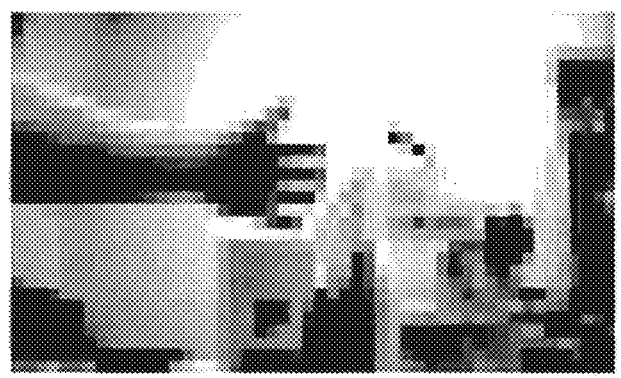
FIGS. 4 to 6 are screen views illustrating the moving object detecting process of the motion detecting apparatus according to the embodiment of the present invention.
Figure 4:
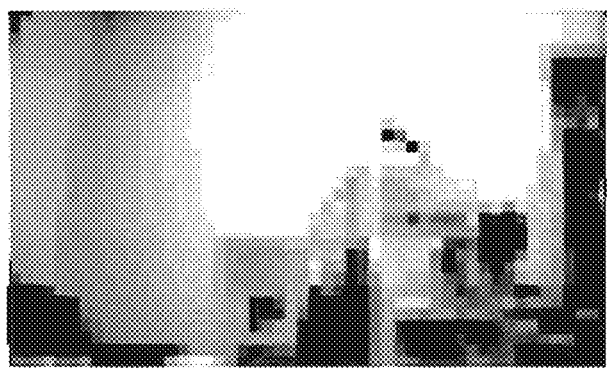
Figure 4:
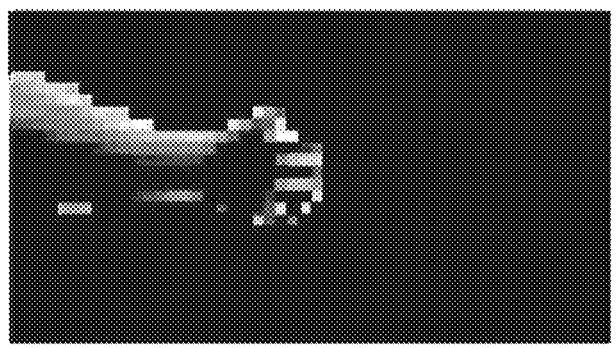
Figure 5:
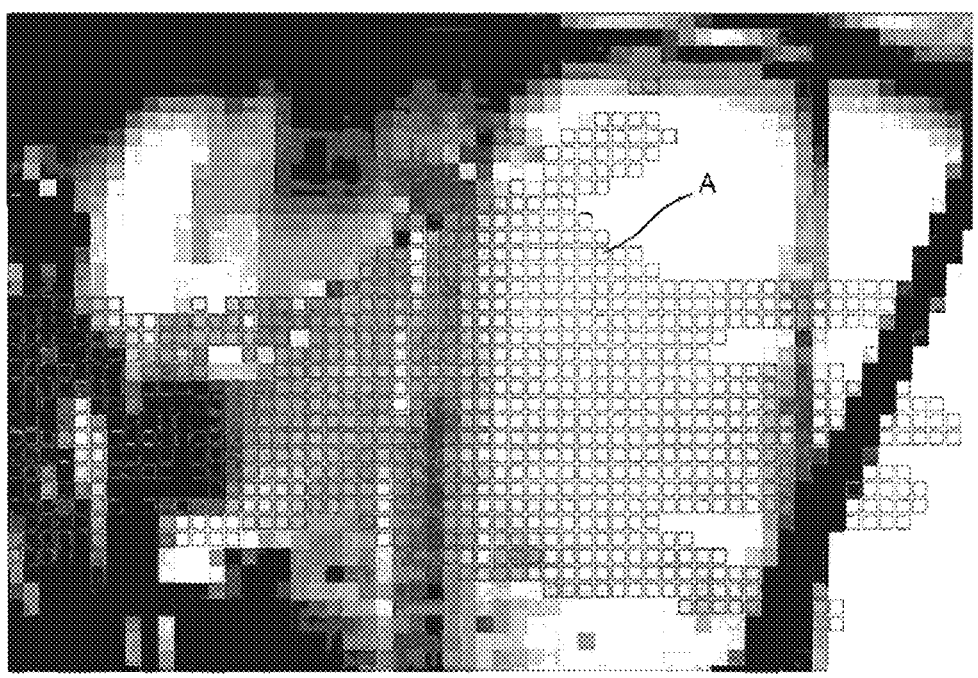
Figure 6:
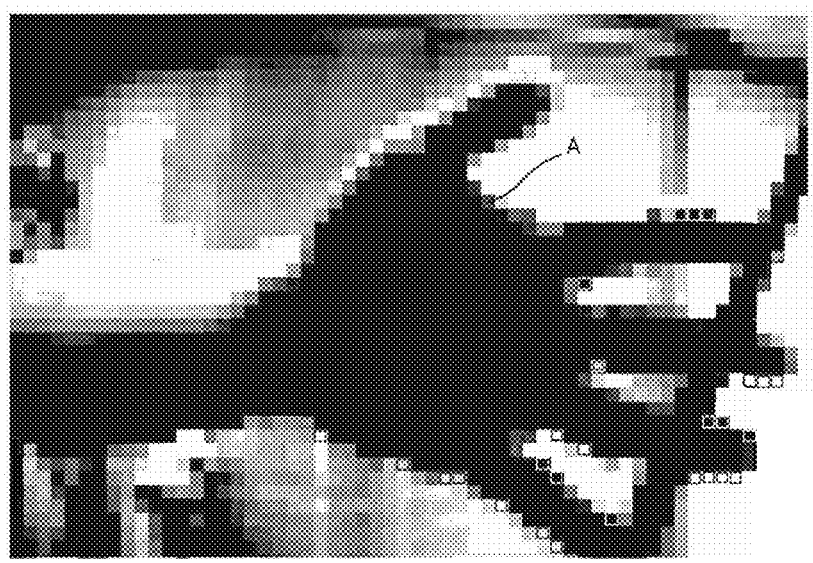

FIGS. 4 to 6 are screen views illustrating the moving object detecting process of the motion detecting apparatus 100 according to the embodiment.

First, as shown in FIG. 4, the motion detecting apparatus 100 can scale the input image, accumulate the brightness on a pixel basis and calculate the pixel average.

Thereafter, the motion detecting apparatus 100 can calculate the absolute value of deviation between the brightness and the average for the pixels of the input image consistently received, compare the absolute value with the preset background reference value, determine pixels whose absolute value is smaller than the background reference value, as the background, thereby generating and providing a background image as shown.

In addition, the motion detecting apparatus 100 can determine featured pixels, which are pixels whose absolute value exceeds the preset reference value, of pixels of the input image consistently received, as the object, thereby generating and providing an object image as shown.

In addition, as shown in FIG. 5, the motion detecting apparatus 100 can detect an object region A constructed by one or more featured by pixels in the input image based on the information on featured pixels included in the object image and determine the featured pixels belonging to the object region as the object only when the number of featured pixels in the object region A is larger than the preset number.

Through this process, noises such as light, dusts and so on in a small region cannot be recognized as an object.

In addition, as shown in FIG. 6, if there is less change in the brightness as featured pixels determined as the object consistently appear in the input image for the preset reference time, the motion detecting apparatus 100 can update the average of the featured pixels to alleviate deviation between the brightness and the average, thereby allowing the featured pixels belonging to the object region A to be determined as the background.

As one example, the motion detecting apparatus 100 may determine a hand A appearing in the input image as an object, as shown in FIG. 5, and may determine the hand A as a background if the hand does not disappear from the input image for the preset reference time, as shown in FIG. 6.

Figure 7:
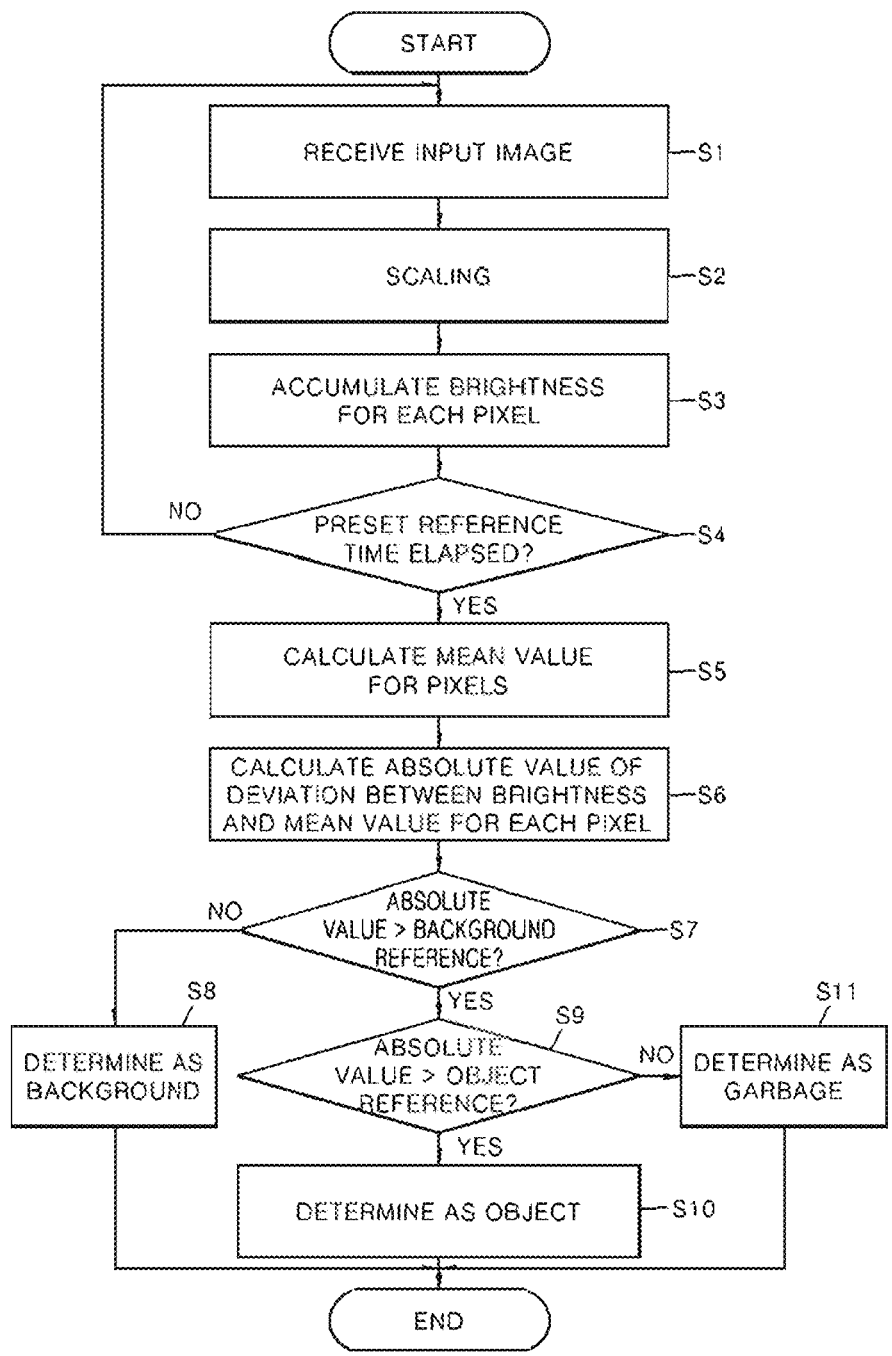
FIG. 7 is a flow chart for explaining a motion detecting method performed by the motion detecting apparatus according to the embodiment of the present invention.

FIG. 7 is a flow chart for explaining a motion detecting method performed by the motion detecting apparatus 100 according to the embodiment of the present invention. Referring to FIG. 7, the motion detecting apparatus 100 can receive the input image (S1) and scale the input image by dividing the input image into blocks, each of which corresponds to one pixel (S2).

Thereafter, the motion detecting apparatus 100 can accumulate brightness for pixels of the scaled input image (S3) and calculate the average of the pixels (S5) when the brightness is accumulated for the preset reference time (S4).

Next, the motion detecting apparatus 100 can calculate the absolute value of deviation between the brightness and the average for the pixels (S6), compare the absolute value with the preset background reference value (S7), and determine pixels having the absolute value smaller than the background reference value as a background (S8).

Thereafter, the motion detecting apparatus 100 can determine featured pixels having the absolute value exceeding (S9) the preset object reference value, of the pixels as an object with motion (S10).

At this time, the motion detecting apparatus 100 can determine pixels having the absolute value larger than the background reference value and smaller than the object reference value (S9) as garbage to be disregarded (S11).

Figure 8:
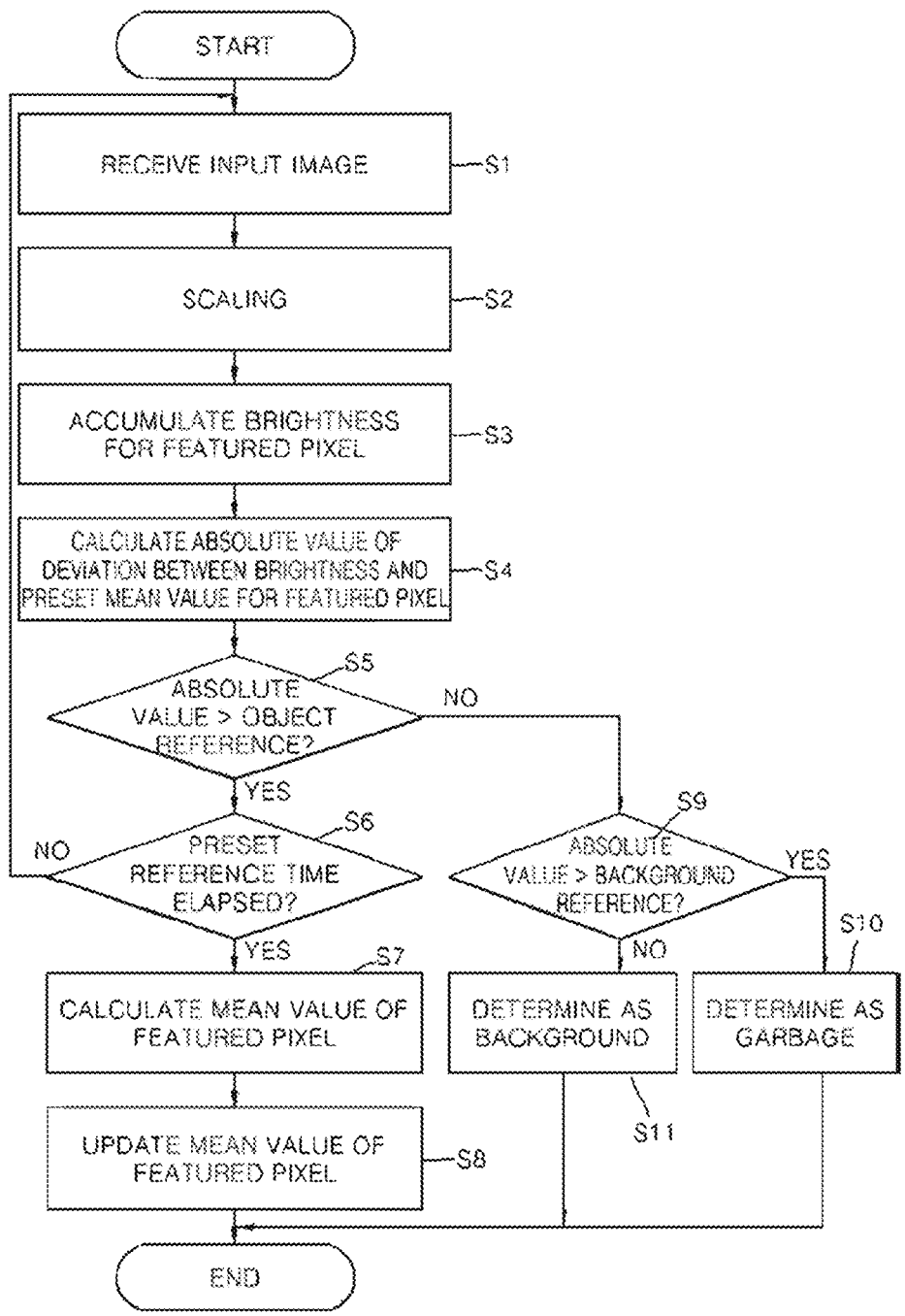
FIG. 8 is a flow chart for explaining a motion detecting method performed by the motion detecting apparatus according to another embodiment of the present invention.

FIG. 8 is a flow chart for explaining a motion detecting method performed by the motion detecting apparatus 100 according to another embodiment of the present invention. The motion detecting apparatus 100 can receive the input image (S1) after the featured pixels are detected, and scale the input image by dividing the input image into blocks, each of which corresponds to one pixel (S2).

Thereafter, the motion detecting apparatus 100 can accumulate brightness for the featured pixels of the scaled input image (S3) and calculate the absolute value of deviation between the brightness and the preset average for the featured pixels (S4)

Next, if the absolute value exceeds the object reference value for more than the preset reference time from the point of time when the absolute value exceeding the object reference value for the featured pixels (S6), the motion detecting apparatus 100 can calculate an updated average by averaging the brightness of the featured pixels accumulated for the preset reference time from the point of time (S7).

Thereafter, the motion detecting apparatus 100 can update the average of the featured pixels with the updated average (S8).

Accordingly, the motion detecting apparatus 100 can calculate the absolute value of deviation between the updated average and the brightness and determine the featured pixels as a background, garbage or an object through comparison between the calculated absolute value and the background reference value/object reference value.

On the other hand, if the absolute value of the featured pixels is smaller than the object reference value (S5), the motion detecting apparatus 100 can determine the featured pixels as garbage or a background (S10 and S11) depending on whether or not the absolute value exceeds the background reference value (S9).

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. An apparatus for detecting a motion, comprising:
a receiving unit which receives an input image;
an average calculating unit which calculates an average of pixels by accumulating brightness of the input image on a pixel basis;
an updating unit which updates the average with an updated average obtained by averaging brightness of featured pixels, in corporation with the average calculating unit, the featured pixels having an absolute value of deviation between the brightness and the average exceeding a preset object reference value, and the featured pixels accumulated from a point of time when the absolute value is received, if the absolute value exceeds the object reference value for more than a preset reference time from the point of time, the updating unit updating the average as a step curve by disregarding the brightness of the featured pixels if the absolute value does not exceed the object reference value for more than the preset reference time from the point of time; and a determining unit which compares the absolute value with at least one of a preset background reference value and the object reference value for the pixels, determines the pixels as a background if the absolute value is smaller than the background reference value, determines the pixels as garbage to be disregarded if the absolute value is larger than the background reference value and smaller than the object reference value, and determines the pixels as a moving object if the pixels are the featured pixels.

2. The apparatus according to claim 1, wherein, if the number of featured pixels for a region constructed by the featured pixels is larger than a predetermined number, the determining unit determines that an object exists in the region.

3. The apparatus according to claim 1, further comprising a noise attenuating unit which divides the input image into a plurality of blocks, each block having a preset size, scales the input image such that each block corresponds to one pixel, and provides the brightness of the pixels, as an average of brightness of all unit pixels belonging to the blocks, to the average calculating unit.

4. The apparatus according to claim 3, wherein the blocks are constituted by n×m unit pixels.

5. The apparatus according to claim 1, further comprising a correcting unit which converts the input image into a monochrome image.

6. The apparatus according to claim 1, further comprising a sensitivity managing unit which varies at least one of the background reference value and the object reference value based on a user input.

7. A method for detecting a motion in a motion detecting apparatus for detecting a moving object from a received input image, comprising:

a receiving step of receiving an input image;

an average calculating step of calculating an average of pixels by accumulating brightness of the input image on a pixel basis;

a determining step of comparing an absolute value of deviation between the brightness and the average with at least one of a preset background reference value and an preset object reference value for the pixels, determining the pixels as a background if the absolute value is smaller than the background reference value, determining the pixels as garbage to be disregarded if the absolute value is larger than the background reference value and smaller than the object reference value, and determining the pixels as a moving object if the pixels are featured pixels whose absolute value is larger than the object reference value; and an updating step of updating the average by averaging brightness of the featured pixels, the featured pixels having an absolute value of deviation between the brightness and the average exceeding a preset object reference value, and the featured pixels accumulated from a point of time when the absolute value is received, if the absolute value exceeds the object reference value for more than a preset reference time from the point of time, the brightness of the featured pixels being disregarded if the absolute value does not exceed the object reference value for more than the preset reference time from the point of time and the average being updated as a step curve.

8. The method according to claim 7, wherein the determining step further includes, if the number of featured pixels for a region constructed by the featured pixels is larger than a predetermined number, determining that an object exists in the region.

9. The method according to claim 7, further comprising: after the receiving step, a noise attenuating step of dividing the input image into a plurality of blocks, each block having a preset size, scaling the input image such that each block corresponds to one pixel, and calculating the brightness of the pixels as an average of brightness of all unit pixels belonging to the blocks.

* * * * *